Dec. 18, 1928.  
C. PEARSON  
ADJUSTING MECHANISM FOR SWEEP RAKES  
Filed Nov. 26, 1924
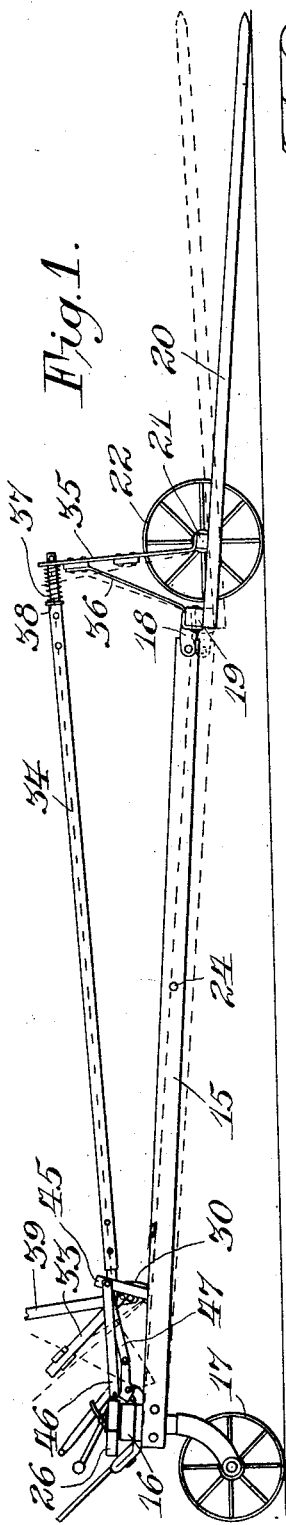
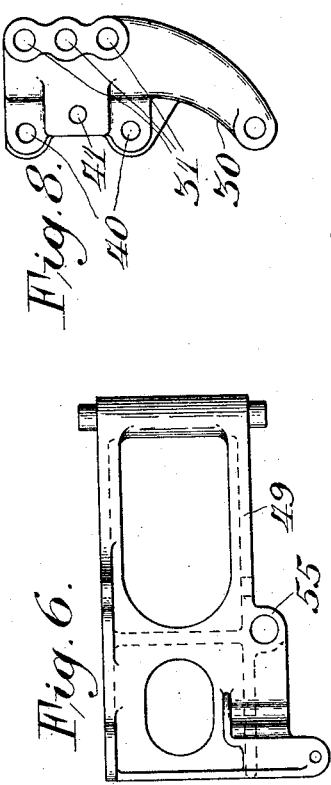
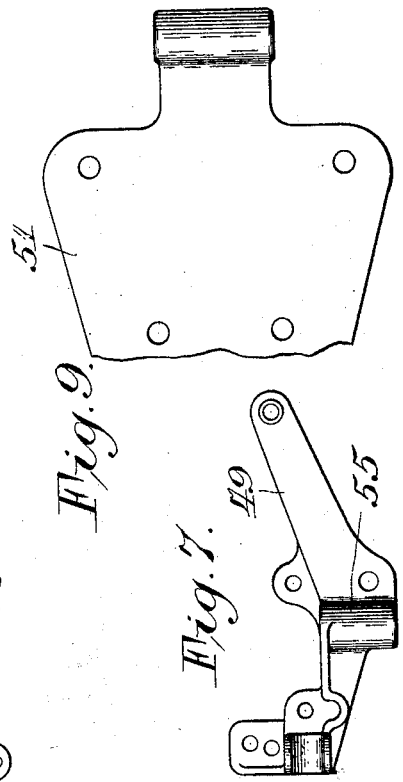
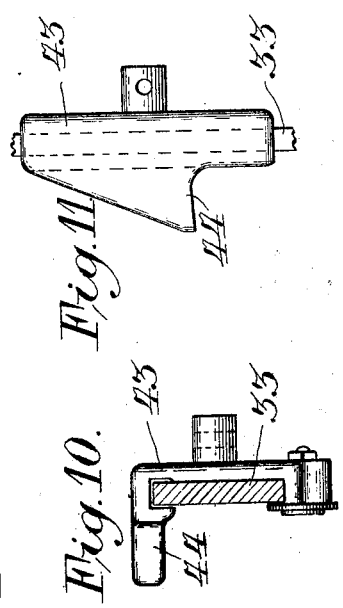
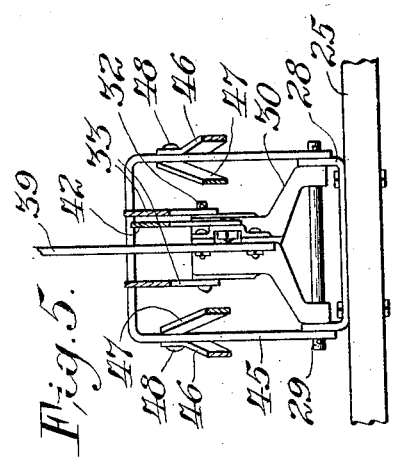
Inventor.  
Charles Pearson,  
By W. P. Declute  
Atty.

Dec. 18, 1928.  1,695,503
C. PEARSON
ADJUSTING MECHANISM FOR SWEEP RAKES
Filed Nov. 26, 1924   3 Sheets-Sheet 2

Inventor.
Charles Pearson,
By H. P. Doolittle
Atty.

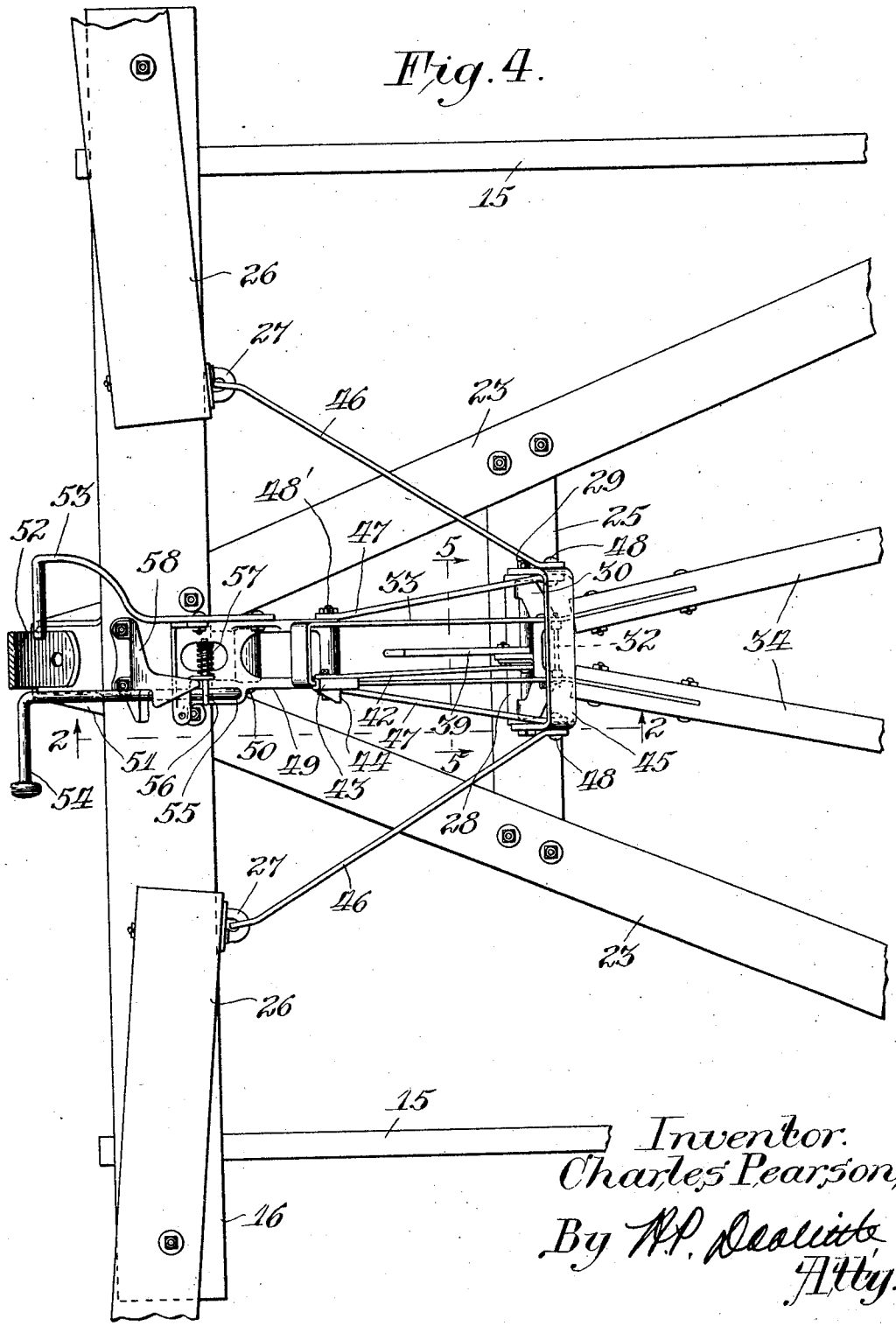

Patented Dec. 18, 1928.

1,695,503

UNITED STATES PATENT OFFICE.

CHARLES PEARSON, OF CHICAGO, ILLINOIS, ASSIGNOR TO INTERNATIONAL HARVESTER COMPANY, A CORPORATION OF NEW JERSEY.

ADJUSTING MECHANISM FOR SWEEP RAKES.

Application filed November 26, 1924. Serial No. 752,287.

This invention relates generally to hay rakes and more specifically to the type of rake known as sweep rakes, which are utilized for the purpose of gathering and transporting stacks or cocks of hay or similar material across a field to a stacking machine which takes the load from the sweep rake and builds it into a stack.

The objects of this invention are to provide a novel and efficient adjusting mechanism for a sweep rake; to provide an adjusting mechanism which will positively hold the teeth of the raking platform in a raised position for transport purposes and, when in ground contacting position for sweeping or gathering purposes, to permit a yielding or floating action thereof so that it will conform to the ground contour and prevent breakage of the rake teeth due to irregularities in the field over which the machine is passing; to provide an adjusting means which is adapted for either manual control or power control by the draft animals, or both a manual and power control acting simultaneously to assist one another; and, lastly, to provide an adjusting mechanism of simple construction which will permit, because of its cheapness, of successful manufacture and commercial exploitation.

Briefly, the mechanism by which these objects are accomplished comprises a primary or hand lever mechanism and a secondary or foot lever mechanism, the two lever mechanisms being connected by a toggle link so that they may cooperate in combination with the draft control in raising the rake platform when loaded, and, when the platform is in its raised adjusted position, the lever mechanisms may be locked to keep the platform raised; when the rake platform is in ground contacting position, the secondary or foot lever mechanism is positively locked while the primary or hand lever mechanism may, by means of a lost motion device, permit a floating action of the rake platform to conform to irregularities in the field and to prevent rake tine breakage.

Referring to the accompanying drawings, wherein like characters of reference denote like parts, it will be observed that,—

Fig. 1 is a side elevational view of a sweep hay rake upon which is mounted the improved adjusting mechanism of the present invention;

Fig. 4 is an enlarged plan view of the rear section of a sweep rake showing the adjusting mechanism mounted thereon;

Fig. 5 is a front sectional view of the hand lever control taken along the line 5—5 of Fig. 4 looking in the direction of the arrows;

Figs. 6 and 7 are, respectively, plan and side detail views of the foot lever bracket;

Fig. 8 is a side detail view of the hand lever bracket;

Fig. 9 is a detail plan view of a part of the seat bracket to which the foot lever bracket is pivoted; and Figs. 10 and 11 are, respectively, sectional and end views of the slide member.

Figure 2:
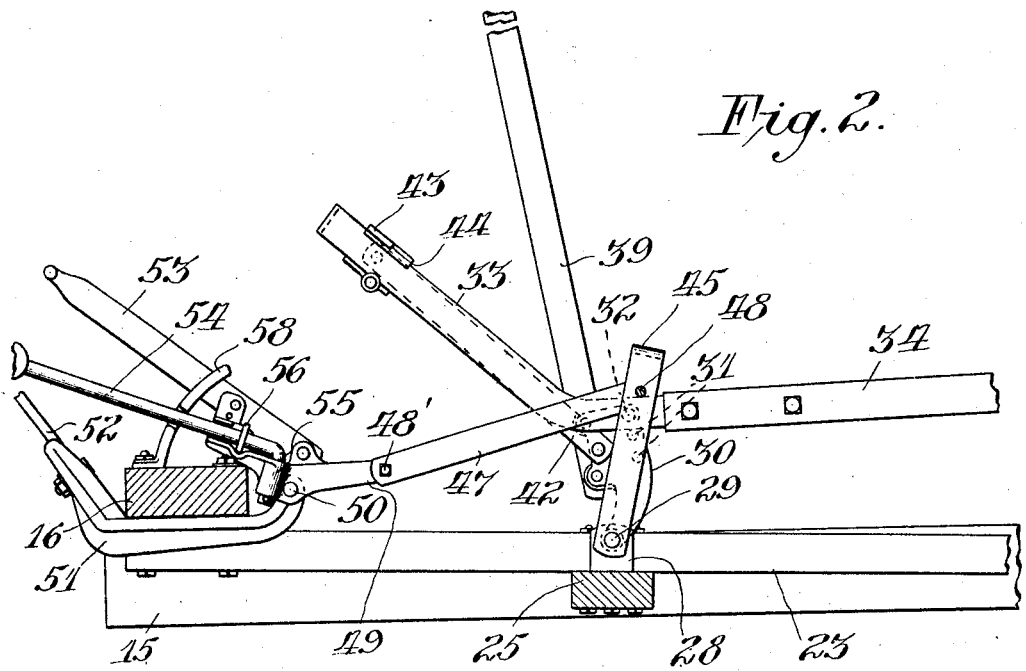
Fig. 2 is an enlarged detail side view of the lever mechanism shown in Fig. 1 when the rake platform is in ground contacting position for raking and gathering a load, the view being taken along the line 2—2 of Fig. 4 looking in the direction of the arrows.

The general constructional details of the hay rake disclosed in the accompanying drawings are standard and conventional in this art. The machine comprises a pair of longitudinally extending side frame members 15, a rearwardly disposed and transversely extending cross frame member 16, said members constituting the main frame of the machine and supported at its rear end on a pair of trailing caster wheels 17 (only one being shown); the forward end of the main frame having pivoted thereto, by means of brackets 18, the rear cross bar 19 of the rake platform made up of a plurality of longitudinally extending, spaced tines or teeth 20, which in turn are tied together by a cross bar 21. The rake platform or teeth 20 are supported on a pair of front wheels 22 (only one of which is shown) and are adapted for a rocking movement about the axis of the bar 21 because of the pivotal connection to the main frame. The main frame is further strengthened by a pair of forwardly extending, diverging bars 23 bolted at their rear ends to the main cross bar 16 and at their forward ends to the side frame bars 15, as at 24 (see Fig. 1). Disposed slightly to the front of the cross frame member 16 is a cross bar 25 securely bolted to the forwardly extending bars 23.

Upon opposite sides of the longitudinal median line of the machine and pivotally carried by the cross bar 16 is a pair of draft bars 26 provided at their inner ends with hook eye bolts 27 for a purpose to be hereinafter described. The outer ends of these draft appliances carry the usual singletree for the draft animals, one animal pulling on each side of the machine, as is well known in this art. For this reason it has not been thought necessary to show the outer ends of these draft bars with singletrees affixed thereto.

Lever mechanisms for the adjustment of rake platforms of machines of this type are, of course, common. These conventional lever mechanisms may be locked to hold the platform raised for transport purposes and they also hold the rake platform in a locked position when the platform is in ground contacting position, when used for raking purposes. Herein lies the great problem which the mechanism of the present invention proposes to solve and overcome. Due to irregularities in the field and other obstructions, the rake teeth of the platform are frequently broken because they cannot yield or float over the obstruction or irregularity. In the device of the present invention the rake platform and teeth are yieldingly retained in ground contacting position so that the tendency of tooth breakage is reduced to a minimum and so that they may also conform to the contour of the ground when gathering a load.

The forward bar 25 of the main frame has a cleat-like member 28 securely bolted thereto through which is disposed a pintle 29 on which is mounted for pivotal movement an upwardly extending hand lever bracket 30 (see Figs. 2, 3, 5 and 8). This bracket 30 is provided on its upper forward side with a plurality of pairs of apertures 31, each pair of which is adapted to support pivotally, by means of a pintle 32, the oppositely arranged legs of a bail member 33. The bail, as viewed in Figs. 3 and 5, has its rear portion angularly bent upwards while its forward leg portions extend horizontally and forwardly of the hand lever bracket 30 and are each securely bolted to a forwardly extending and outwardly diverging adjusting member 34, these members, as shown in Fig. 1, being connected to the rake platform head 35 supported on the rake platform by braces 36, a cushion spring 37 being disposed between a shoulder 38 near the end of the adjusting members and the rake head 35.

Figure 3:
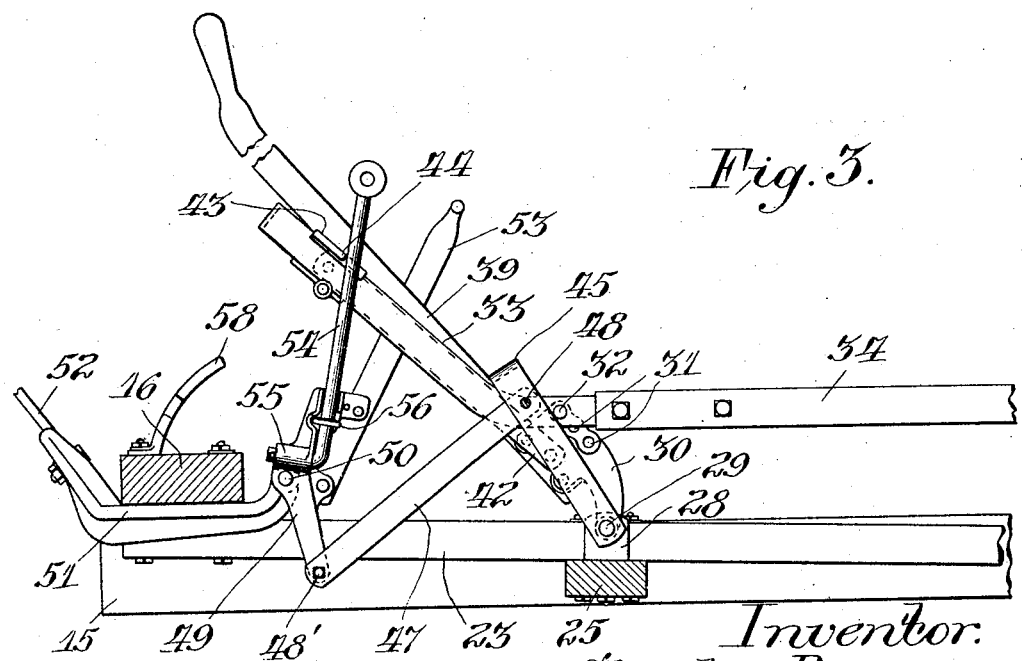
Fig. 3 is identical with Fig. 2 except that it shows the parts in the position of adjustment shown in dotted lines in Fig. 1; that is, with the rake platform in raised position as when the machine is being employed for transporting the load of hay.

Viewing Figs. 2, 3 and 5, it will be observed that an upwardly extending hand lever 39 is securely bolted in apertures 40 of the hand lever bracket. Disposed intermediately between these apertures 40 is another aperture 41 to which is pivotally connected one end of a rearwardly extending link 42 which extends upwardly between the legs of the bail and pivotally carries at its rearmost end a slide member 43, the slide being provided with a latch portion 44 extending laterally beyond the sides of the bail (see Figs. 10 and 11).

In addition to the hand lever mechanism, it is also well, when the rake is loaded, that a power adjustment be provided which will utilize the pulling effort of the draft animals for adjusting the rake to raised transport position. There has accordingly been provided a bail member 45 also pivotally carried on the pintle 29 at its outer ends in the cleat 28, this bail straddling the hand lever bracket 30 and the bail 33. The outer sides of the bail 45 pivotally carry near their upper ends a pair of rearwardly extending links 46 which, as viewed in Fig. 4 especially, are connected to the eye bolts 27 on the draft bar appliances. The inner upper side ends of the bail 45 are provided with a pair of rearwardly extending links 47 which are pivotally carried by the bail mentioned by means of pins 48. The same pins 48 may function pivotally to carry the links 46. The rear ends of the rearwardly extending links 47 are pivoted by means of a bolt 48' to the forward end of a foot lever bracket 49 which is pivoted intermediately of its ends, as at 50, to a seat bracket 51 securely bolted to the under side of the cross frame bar 16 and carrying a rearwardly extending and conventional seat supporting member 52. The foot lever bracket and links 47 thus form a toggle connection with a breaking point at 48' which connects the bail 45 with a secondary or foot lever mechanism, of which the bracket 49 is a part, and comprising a foot lever 53 bolted to the foot lever bracket at the front of the pivotal point 50. Another foot lever or latch member 54, having a right angularly bent portion oscillatably mounted for lateral movement in a socket 55 formed in the foot lever bracket, is also carried by the bracket and is yieldingly retained against the side of the bracket by means of an eye bolt 56 through which the arm of the lever 54 passes, and is releasably held against the bracket by means of a latch spring 57. The foot latch 54 cooperates with a laterally notched latch plate 58 bolted to the bar 16.

The operation of the improved sweep rake will now be described. In the normal position of raking, the mechanism is as shown in Fig. 1 with the rake teeth contacting the ground and the foot lever mechanism held inoperative while the hand lever mechanism is free to move for permitting a floating action of the rake platform. (See Fig. 2.) With a horse on each side, the machine is being pulled forwardly to push the teeth under a cock of hay to gather it, the draft lift power links 46 being inoperative because of the foot latch 54 held in locked position. As the machine advances, the teeth may freely rise and fall to conform to the ground contour. The teeth may drop down into dwells or hollows a distance governed by the angular distance between the hand lever 39 and the bail 45, while they may rise a distance equal to the angular distance between the lever 39 and bail 33, and the sum of these angular distances determines the total float which the rake teeth are capable of having. It will be here remembered that the adjusting bars 34 are supported on the hand lever mechanism. During the gathering operation the operator on his seat may assist in making a clean job of raking by pressing his foot on the bight of the bail 33, whereby, as will be evident, the teeth will more aggressively contact the ground.

We will now assume that a full load has been gathered and we desire to have it transported to a stacking machine for building the hay into a stack. For transport it is necessary to raise the load and platform to clear the ground and, if the machine is at a standstill, this may be accomplished by pulling rearwardly on hand lever 39 and by moving the latch lever 54 laterally out of its notch and simultaneously pushing forwardly on the foot lever 53. The operator's feet, when pulling rearwardly on the hand lever, would naturally move forwardly unless he expended considerable physical force in bracing his feet against such movement. Thus, instead of providing a foot rest, the foot lever and foot latch serve this function as well as taking up the force exerted by the operator's feet to break the toggle and move the bail 45 rearwardly against the hand lever 39 to assist the hand operation of raising the load. The load and platform now being raised, some means is necessary to lock the levers in the position they have now assumed (Fig. 3) to retain the parts in this position. Such means is found in the latch 44 on the slide 43. This slide alway is kept in a fixed position relative to the arcs traveled by the foot and hand levers, because it is held in this position by its supporting link 42 pivoted in the central aperture on the hand lever bracket 30. The position of the bail 33 may change, however, with respect to the slide 43, as when the platform floats or when the adjustment of the members 34 is made with respect to the holes 31 for varying the leverage and extent of float of the platform. Thus, the bail moves relatively to the slide which is kept in a fixed position, as explained.

It is not necessary, however, for the operator to exert so much physical force to raise the load, for he may utilize the draft effort of the pulling animals to assist in accomplishing this result. Again, let us assume the parts are as shown in Fig. 2. As the animals pull, the operator releases the foot latch 54. The toggle is now free and the pull of the animals is transmitted by the bars 26 through the power links 46 to force the bail 45 against the lever 39 to move it rearwardly. The animals thus do most of the work and the operator merely pushes the foot latch forwardly to lock it with the latch on the slide. When the load has been discharged, which is accomplished by backing the machine, releasing of the foot latch from the slide permits the platform to return by gravity to ground contact position, the operator, by exerting a slight downward pressure on the foot latch, assuring himself that said latch lever will be locked in the notch in the plate 58 to hold the toggle and power links inoperative for the next forward movement for the gathering operation.

It will thus be seen that there is herein provided a mechanism in which the several objects of this invention are achieved and that the same is simple, yet dependable, in action and well adapted to meet the exacting conditions of hard, practical use. While there has been shown the preferred form of the invention, it should be understood that various changes in form, construction and arrangement of parts may be resorted to by those skilled in the art, without departing from the spirit of the invention as hereinafter claimed.

What is claimed is:

1. In a rake, the combination of a frame, a rake platform pivoted thereto, a bracket pivoted to the frame, adjusting members carried by the bracket and connected to the platform, a lever on the bracket for adjusting the platform, an assisting means normally spaced from the lever, means for moving said assisting means to engage the lever for raising the platform, and means independent of the lever for positively locking the platform in raised position.

2. In a hay rake, the combination of a frame, a rake platform pivoted thereon, a bracket pivoted on the frame and carrying a lever, means connecting the bracket and platform whereby the lever may adjust the platform, and means pivoted on the frame independently of the bracket and operable to engage the lever to assist in adjusting the platform.

3. In a hay rake, the combination of a frame, a rake platform pivoted thereon, a bracket pivoted on the frame and carrying a lever, means connecting the bracket and platform for adjusting the platform, and a bail straddling the bracket and pivoted to the frame independently of the bracket for engaging the lever to assist in adjusting the platform.

4. In a hay rake, the combination of a frame, a rake platform pivoted thereon, a bracket pivoted on the frame and carrying a lever, means connecting the bracket and platform for adjusting the platform, a member pivotally carried by the frame independently of the bracket and normally spaced from the lever, and manually operable means for moving said member to engage the lever above the bracket for assisting it in adjusting the platform.

5. In a hay rake, the combination of a frame, a rake platform pivoted thereon, a bracket pivoted on the frame and carrying a lever, means connecting the bracket and platform for adjusting the platform, a member pivotally carried by the frame independently of the bracket and normally spaced from the lever, and draft operated means for moving said member to engage the lever above the bracket for assisting it in adjusting the platform.

6. In a rake, the combination of a frame, a rake platform pivoted thereon, a bracket pivoted on the frame, connections from the bracket to the platform, a lever secured to the bracket, a member pivoted on the frame independently of the bracket, said member being normally spaced from the lever and operable independently thereof, and draft power means and manually operable means connected to said member for moving it to engage the lever and assist it in adjusting the platform.

7. In a hay rake, the combination of a frame, a rake platform pivoted thereto, a bracket pivoted to the frame, adjusting means carried on the bracket and connected to said platform, a lever secured to the bracket, a bail pivoted to the frame on the same fulcrum with the bracket, said bail straddling the bracket and normally angularly spaced from the lever and movable independently thereof, and means for moving said bail to engage the lever to assist it in adjusting the platform.

8. In a hay rake, the combination of a frame, a rake platform pivoted thereto, a bracket pivoted on the frame and connected to the platform for adjusting it, a lever secured to the bracket, said bracket and lever having a limited free movement for permitting the platform yieldingly to contact the ground, a vertically disposed bail pivoted to the frame, said bail being normally angularly spaced from the lever and straddling the bracket, the angular distance between the lever and the bight of the bail determining the distance the platform may yield downwardly, and means for moving the bail so that its bight may engage the lever above the bracket for adjusting the platform to raised position.

9. In a hay rake, the combination of a frame, a rake platform pivoted thereon, a lever pivoted on the frame and connected to the platform for adjusting it, said lever having a limited free fore and aft movement for permitting the platform to rise and fall when contacting the ground, means angularly spaced forwardly of the lever for limiting the movement of the lever to control the fall of the platform, and other means angularly spaced forwardly of the lever for limiting the movement of the lever to control the rise of the platform.

10. In a hay rake, the combination of a frame, a rake platform pivoted thereon, a lever pivoted on the frame and connected to the platform for adjusting it, said lever having a limited free fore and aft movement for permitting the platform to rise and fall when contacting the ground, a bail spaced forwardly of the lever to limit the movement of the lever in that direction to control the fall of the platform, and another bail spaced rearwardly of the lever to limit its movement in that direction for limiting the rise of the platform.

11. In a hay rake, the combination of a frame, a rake platform pivoted thereon, a lever pivoted on the frame and connected to the frame for adjusting it from ground contacting to raised position, said lever having a limited free movement for permitting the platform to rise and fall when contacting the ground, means spaced from the lever to limit its movement in one direction to control the fall of the platform in this position, other means spaced from the lever to limit its movement in another direction to control the rise of the platform in this position, and means connected to one of said means for moving it to engage the lever for assisting it in adjusting the platform from ground engaging to raised position.

12. In a hay rake, the combination of a frame, a rake platform pivoted thereon, a lever pivoted on the frame and connected to the platform for adjusting it from ground contacting to raised position, said lever having a limited free movement for permitting the platform to rise and fall when contacting the ground, a bail spaced from the lever to limit the movement of the lever in one direction to control the fall of the platform, another bail spaced from the lever to limit its movement in another direction, and means connected to one of said bails for moving it to engage the lever to assist it in adjusting the platform from ground contacting to raised position.

13. In a hay rake, the combination of a frame, a rake platform pivoted thereon, a lever, means connecting the lever and platform for adjusting it, a member normally spaced from the lever, a second lever connected to the member for moving it to engage the first lever to assist it in adjusting the platform, and a latch cooperating with the second lever for locking the first lever, the member and platform in adjusted position.

14. In a hay rake, the combination of a frame, a rake platform pivoted thereon, a lever, means connecting the lever and platform for adjusting it, said connecting means extending rearwardly of the lever and provided with a latch, a member adapted to engage the lever, a second lever connected to the member for moving it to engage and assist the first lever in adjusting the platform, said second lever cooperating with the latch for holding the second lever, the member and platform in adjusted position.

15. In a hay rake, the combination of a frame, a rake platfrom pivoted on the frame, adjusting means connecting the platform with a hand lever mounted on the frame, a bail pivoted on the frame and straddling said hand lever, a foot lever pivoted on the frame, means connecting the bail and foot lever whereby upon movement of the latter the bail will cooperate with the hand lever to adjust the platform, and latch means for locking said foot lever to maintain the platform in adjusted position.

16. In a hay rake, the combination of a frame, a rake platform adjustably mounted on the frame, two bail members angularly disposed with respect to each other, a lever movable between them for adjusting the platform, means for moving one of said bails to move the lever for adjusting the platform, and means on the other bail for interlocking with the first ball moving means to retain the platform in adjusted position.

17. In a hay rake, the combination of a frame, a rake platform adjustably mounted thereon, adjusting members operable by a lever for adjusting the platform, a second lever spaced from the first for assisting it to adjust the platform, and means carried on the adjusting members with which the second lever may lock to retain the platform in adjusted position.

18. In a hay rake, the combination of a frame, a rake platform adjustably mounted thereon, a pair of spaced levers for adjusting the platform, and a member engageable with one of said levers and connected to the other lever by a toggle link whereby said last mentioned lever may assist the first mentioned lever in adjusting the platform.

19. In a hay rake, the combination of a frame, a rake platform pivoted thereon, a plurality of adjusting members connected at one end to the rake platform and at their other ends to a bracket pivoted on the frame, and a lever for tilting the bracket to adjust the platform, the bracket being provided with a plurality of apertures whereby it is adapted to carry the adjusting members in any one of a number of positions of adjustment, thereby determining the extent of adjustment to be imparted to the rake platform.

20. In a hay rake, the combination of a frame, a rake platform adjustably mounted thereon, a pair of levers mounted on the frame on spaced fulcrums, said levers being movable toward each other to adjust the platform crossing each other at a predetermined point between the fulcrums, and means located between fulcrums at said predetermined point for locking one of the levers to retain the platform in adjusted position.

21. In an adjusting mechanism for implements having a frame and a member to be adjusted, the combination of a first lever for adjusting said member, means engageable with the first lever to move it, a toggle mechanism connected to said moving means, said toggle mechanism including a second lever for operating the moving means, and means for causing said second lever to move first laterally and the upwardly.

22. In an adjusting mechanism for implements having a frame and a member to be adjusted, the combination of a first lever for adjusting said member, means engageable with the first lever to move it, a toggle mechanism connected to said moving means, said toggle mechanism including a second lever for operating the moving means, a latch plate on the frame having a side opening to receive the second lever, whereby said second lever is caused to be moved first laterally and then upwardly to disengage the latch plate for moving said moving means.

In testimony whereof I affix my signature.

CHARLES PEARSON.

CERTIFICATE OF CORRECTION.

Patent No. 1,695,503.                     Granted December 18, 1928, to

CHARLES PEARSON.

It is hereby certified that error appears in the printed specification of the above numbered patent requiring correction as follows: Page 4, line 66, claim 9, for the word "forwardly" read "rearwardly"; page 5, line 28, claim 16, for the word "ball" read "bail"; same page, line 66, claim 20, before the word "fulcrums" insert the word "said", and line 78, claim 21, for the article "the" read "then"; and that the said Letters Patent should be read with these corrections therein that the same may conform to the record of the case in the Patent Office.

Signed and sealed this 26th day of February, A. D. 1929.

(Seal)

M. J. Moore,
Acting Commissioner of Patents.